United States Patent
Fabrega (10) Patent No.: US 11,424,614 B2
(45) Date of Patent: Aug. 23, 2022

(54) SYSTEM FOR LIMITING INRUSH CURRENT IN A BATTERY ENDPOINT

(71) Applicant: Landis+Gyr Innovations, Inc., Alpharetta, GA (US)

(72) Inventor: Daniel E. Fabrega, Marietta, GA (US)

(73) Assignee: LANDIS+GYR INNOVATIONS, INC., Alpharetta, GA (US)

( * ) Notice: Subject to any disclaimer, the term of this patent is extended or adjusted under 35 U.S.C. 154(b) by 511 days.

(21) Appl. No.: 16/582,313

(22) Filed: Sep. 25, 2019

(65) Prior Publication Data

US 2021/0091560 A1 Mar. 25, 2021

(51) Int. Cl.
- H02H 9/00 (2006.01)
- H02J 13/00 (2006.01)
- H02J 7/24 (2006.01)

(52) U.S. Cl.
CPC ............ *H02H 9/002* (2013.01); *H02J 7/243* (2020.01); *H02J 13/00009* (2020.01)

(58) Field of Classification Search
CPC .... H02H 9/002; H02J 7/0031; H02J 7/00302; H02J 7/243; H02J 13/00009
USPC ........................................................ 361/93.9
See application file for complete search history.

(56) References Cited

U.S. PATENT DOCUMENTS

| | | | | |
|---|---|---|---|---|
| 5,155,648 A | * | 10/1992 | Gauthier | H04B 15/02 361/111 |
| 5,951,660 A | * | 9/1999 | Van Wonterghem | H02H 9/004 710/302 |
| 6,836,102 B2 | * | 12/2004 | Sudou | H02M 3/155 323/282 |
| 7,696,646 B2 | * | 4/2010 | Tu | G09G 3/3696 307/130 |
| 7,715,163 B2 | * | 5/2010 | Lee | H02H 9/001 361/57 |
| 2005/0231874 A1 | | 10/2005 | Hussein et al. | |
| 2016/0065103 A1 | | 3/2016 | Glenn et al. | |

FOREIGN PATENT DOCUMENTS

| | | | |
|---|---|---|---|
| JP | 2004094480 A | * | 3/2004 |
| JP | 2009195037 | | 8/2009 |

OTHER PUBLICATIONS

International Patent Application No. PCT/US2020/051387, International Search Report and Written Opinion, dated Nov. 4, 2020, 11 pages.

* cited by examiner

*Primary Examiner* — Kevin J Comber (74) *Attorney, Agent, or Firm* — Kilpatrick Townsend & Stockton LLP (57) ABSTRACT

Described is a system that includes a solid-state switch in series with a battery and a controller. The system also includes a capacitor coupled between a source and a gate of the solid-state switch and a resistor coupled between the gate of the solid-state switch and ground. The solid-state switch gradually transitions from an open state to a closed state over a time constant of the capacitor and the resistor upon application of power from the battery to the solid-state switch. The system further includes a first switching device that controls the application of power from the battery to the solid-state switch. Additionally, the system includes a second switching device that provides a discharge path of the capacitor upon completion of a task by the controller.

16 Claims, 5 Drawing Sheets

SYSTEM FOR LIMITING INRUSH CURRENT IN A BATTERY ENDPOINT

TECHNICAL FIELD

The field of the present disclosure relates to inrush current protection of an electrical system. More specifically, the present disclosure relates to inrush current limiting systems and methods used to control application of power to loads associated with battery endpoints.

BACKGROUND

Battery endpoints may be used in resource metering. For example, the battery endpoints can provide communication functions for a meter to communicate with other meters and with a utility. As an age of a battery associated with a battery endpoint increases, the voltage output of the battery may decline. Toward an end of the battery lifespan, communication transmissions from the battery may result in the voltage output of the battery dipping below a power-on-reset (POR) voltage threshold of the battery endpoint. In some examples, dipping below the voltage threshold results in a sporadic microprocessor reset of the battery endpoint.

To prevent the potential sporadic resets for the battery endpoints including older batteries, the usable battery voltage thresholds of the battery endpoints are increased. In an example where the batteries of the battery endpoints may have steep declines in voltage at the end of the battery lifespans, increasing the usable battery thresholds of the battery endpoints may result in a decreased available lifespan of the batteries. Thus, the batteries powering the battery endpoints may provide output voltages below the increased usable battery voltage threshold before useable lifespans of the batteries are actually exhausted.

SUMMARY

Systems for limiting inrush current in a battery endpoint are provided. According to various aspects of the present disclosure, a system may include a resource metrology module and a transmitter that sends data packets associated with the resource metrology module to a head-end system or other resource metering systems. The system also includes a battery that provides power to the transmitter and an inrush current limiter. The inrush current limiter includes a solid-state switch in series with the battery and the transmitter and a capacitor coupled between a source and a gate of the solid-state switch. Further, the inrush current limiter includes a resistor coupled between the gate of the solid-state switch and ground. The solid-state switch is able to gradually transition from an open state to a closed state over a time constant of the capacitor and the resistor upon application of power from the battery to the solid-state switch, and the closed state of the solid-state switch enables transmission of the power from the battery to the transmitter.

In another example, a method includes receiving an input power from an input power source at a solid-state switch of an inrush current limiting device and at a resistor-capacitor circuit of the inrush current limiting device. The inrush current limiting device is in a resistive mode to prevent transmission of an output power from the inrush current limiting device to a transceiver of a resource metering device. The method also includes gradually transitioning the solid-state switch from the resistive mode to a conductive mode over a resistor-capacitor time constant of the resistor-capacitor circuit while maintaining a voltage of the input power above a power-on-reset voltage threshold of a microprocessor controlling the transceiver of the resource metering device. Further, the method includes closing a discharging switch to discharge a capacitor of the resistor-capacitor circuit upon completion of a packet transmission by the transceiver.

In another example, a system includes a solid-state switch in series with a battery and a controller. The system also includes a capacitor coupled between a source and a gate of the solid-state switch and a resistor coupled between the gate of the solid-state switch and ground. The solid-state switch gradually transitions from an open state to a closed state over a time constant of the capacitor and the resistor upon application of power from the battery to the solid-state switch. The system further includes a first switching device that controls the application of power from the battery to the solid-state switch. Additionally, the system includes a second switching device that provides a discharge path of the capacitor upon completion of a task by the controller.

These illustrative aspects and features are mentioned not to limit or define the presently described subject matter, but to provide examples to aid understanding of the concepts described in this application. Other aspects, advantages, and features of the presently described subject matter will become apparent after review of the entire application.

BRIEF DESCRIPTION OF THE DRAWINGS

Aspects and features of the various embodiments will be more apparent by describing examples with reference to the accompanying drawings, in which.

DETAILED DESCRIPTION

While certain examples are described herein, these examples are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Certain aspects and examples of the disclosure relate to inrush current limiting systems and methods used to control application of power to loads associated with battery endpoints. The battery endpoints may be components of a mesh network associated with resource metering. In such an example, the battery endpoints may be used to provide resource metering information or battery endpoint status information to other devices in the mesh network, such as additional metering endpoints or a head-end system of the mesh network.

The inrush current limiting system may be operated to prevent current spikes associated with initiation of a transmission cycle of data from the battery endpoint. As an example, the current spikes that occur when the inrush current limiting system is not present may result in a voltage drop below a power-on-reset voltage threshold of a controller of the battery endpoint. By limiting the inrush current (i.e., avoiding inrush current spikes), the battery endpoint may avoid a potential sporadic reset resulting from a voltage falling below the power-on-reset voltage threshold.

The described embodiments provide an inrush current limiting system that controls a power output from a battery of the battery endpoint to a controller and a communication system of the battery endpoint during initiation of a transmission cycle by the battery endpoint. While the inrush current limiting system is discussed generally for use with a battery endpoint providing resource metering functions, it is by no means so limited. Rather, embodiments of the inrush current limiting system may be used with electrical systems of any type or otherwise as desired.

Figure 1:
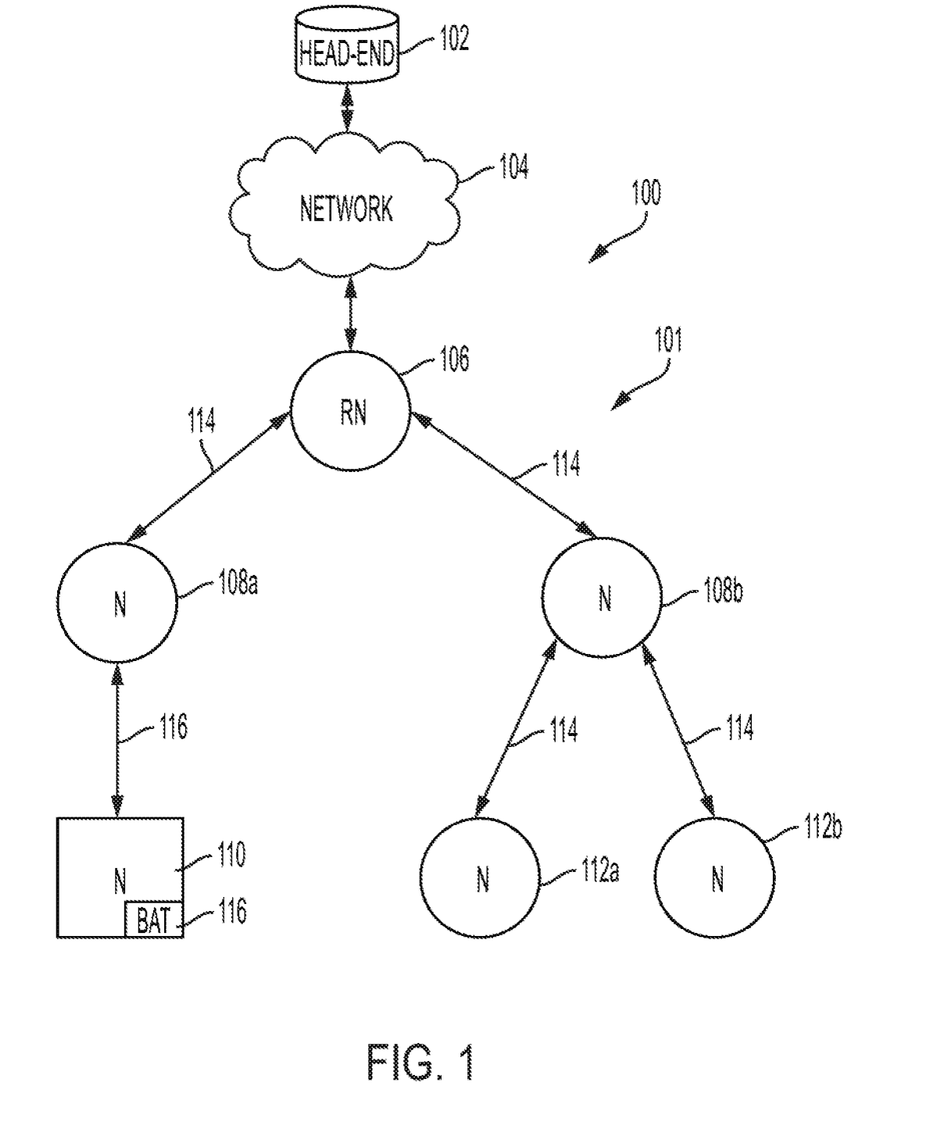
FIG. 1 is a block diagram of a networked system and a mesh network of smart devices, according to certain embodiments of the present disclosure.

FIG. 1 is a block diagram illustrating an example of a networked system 100 and a mesh network 101 of smart devices. The networked system 100 and the mesh network 101 provide a network infrastructure for smart devices (e.g., resource consumption meters, vehicles, home appliances, etc. that include communication technology) to communicate across a network of nodes (i.e., other smart devices), the internet, and/or an intranet. The networked system 100 includes a head-end system 102, which may function as a central processing system that receives a stream of data from a network 104. The network 104 may be the internet, an intranet, or any other data communication network. The mesh network 101 may include a root node 106 that provides a communication path between the network 104 and other nodes 108a and 108b. For example, the root node 106 may collect data from the nodes 108a and 108b and transmit the collected data to the network 104 and ultimately to the head-end system 102 of the networked system 100. The root node 106 may be a personal area network (PAN) coordinator, an internet gateway, or any other device capable of connecting to the network 104. Further, node 110 may communicate with the root node 106 by way of the node 108a, and nodes 112a and 112b may communicate with the root node 106 by way of the node 108b.

The root node 106 may generally be referred to as a parent node due to data links with the nodes 108a and 108b that are located at a node layer (e.g., layer one) below the root node 106. For example, the root node 106 is illustrated as communicating directly with the network 104. As illustrated, nodes 108a and 108b may also be referred to as parent nodes due to data links with the node 110 and the nodes 112a and 112b, respectively, which are located at a node layer (e.g., layer two) below the nodes 108a and 108b. The nodes 108a, 108b, 110, 112a, and 112b may all funnel information up through the node layers to the root node 106, to the network 104, and ultimately to the head-end system 102.

Each of the nodes 106, 108a, 108b, 110, 112a, and 112b are linked with at least one of the other nodes 106, 108a, 108b, 110, 112a, and 112b. Communication links 114 may be created between the nodes 106, 108a, 108b, 110, 112a, and 112b to enable communication between the nodes 106, 108a, 108b, 110, 112a, and 112b. For example, each of the nodes 106, 108a, 108b, 110, 112a, and 112b may communicate with each other using wired or wireless communication links 114.

The node 110 represents a battery endpoint (BEP) or another type of low-power endpoint. That is, components of the node 110 are powered by a power source other than mains power (e.g., powered by battery power, solar power, wind generated power, etc.). In an example, battery endpoints are used in gas or water metering devices that are not necessarily located within an accessible proximity to a mains power source. The battery endpoints may also be used in electricity metering devices or any other metrology device. Due to a limited life of a battery 116 used to power components of the node 110, the node 110 and the node 108a may create a link 116 that uses a communication scheme to receive periodic packet transmissions from the node 110. In this manner, the node 110 is able to transmit data to the node 108a during transmission periods and enter a "sleep" or "low-power" mode between packet transmissions. Such an arrangement provides the node 110 with the ability to extend an available lifespan of the battery 116.

In an example, the battery 116 is a manganese dioxide lithium battery with a voltage between 2 and 2.4 V. In another example, the battery 116 may be any other type of lithium ion battery capable of providing power to communication components of the node 110. In some examples, the battery 116 is a rechargeable battery capable of storing energy generated from a solar energy device, a wind energy device, or any other type of renewable energy resource.

In operation, fewer or more nodes may be included in the mesh network 101, and more root nodes 106 may also be included in the networked system 100. Additionally, while the mesh network 101 depicted in FIG. 1 includes a root node layer (i.e., the root node 106), layer one (i.e., the nodes 108a and 108b), and layer two (i.e., the nodes 110, 112a, and 112b), fewer or more node layers are also contemplated. Further, multiple BEP nodes 110 (or other non-mains powered nodes) may be communicatively coupled to the same node 108a, and additional BEP nodes 110 (or other non-mains powered nodes) may be communicatively coupled to other nodes 108b, 112a, and 112b. Moreover, while FIG. 1 depicts a specific network topology (e.g., a DODAG tree topology), other network topologies are also possible (e.g., a ring topology, a mesh topology, a star topology, etc.).

Figure 2:
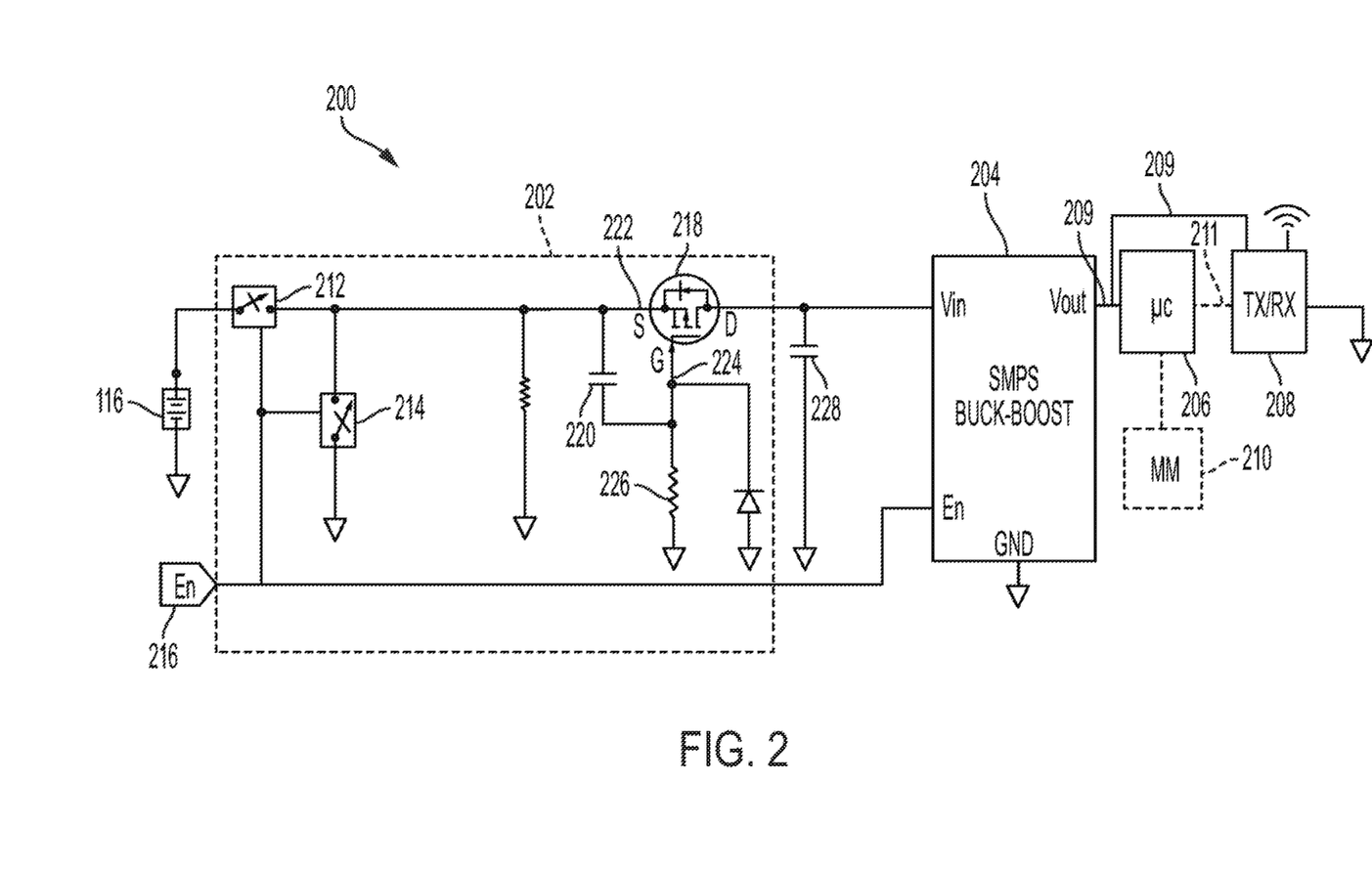
FIG. 2 is a schematic diagram of a battery endpoint node including an inrush current limiter, according to certain embodiments of the present disclosure.

FIG. 2 is a schematic diagram of a battery endpoint node 200 including an inrush current limiter 202. The battery endpoint node 200 may be representative of the node 110 described above with respect to FIG. 1. As illustrated, the inrush current limiter 202 receives a power input from the battery 116, and provides a current limited power output to a switched-mode power supply (SMPS) 204. The SMPS 204 controls the voltage magnitude of the power provided to a microcontroller 206 and a transceiver 208 at a voltage output 209 of the SMPS 204. For example, the SMPS 204 may buck or boost the voltage of the power provided to the microcontroller 206 and the transceiver 208 to 3.4 volts. Other voltage values stabilized by the SMPS 204 are also contemplated. At startup of a data transmission cycle, the SMPS 204 and the bulk capacitor 228 may draw a significant amount of inrush current (e.g., 1 to 2 amperes). In operation, the bulk input capacitor 228 may provide the SMPS 204 with an immediate voltage source for use in boosting an output voltage of the SMPS 204.

The microcontroller 206 may be any processing device that is capable of executing instructions stored in a non-transitory machine-readable medium to control operations of the transceiver 208. In an example, the microcontroller 206 and the transceiver 208 may be a system on a chip (SoC). Examples of the microcontroller 206 include an application-specific integrated circuit (ASIC), a field-programmable gate array (FPGA), or any other suitable processing device. Further, the microcontroller 206 can include any number of processing devices, including a single processing device. The non-transitory machine-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In one or more examples, the microcontroller 206 provides data packets and control signals to the transceiver 208 across a data path 211.

In one or more examples, the microcontroller 206 is also capable of executing instructions to control operations of other components of the battery endpoint node 200 in addition to the transceiver 208. For example, the microcontroller 206 may control operations of a metrology module 210 of a resource metering device of the battery endpoint node 200. For example, the microcontroller 206 may perform operations that control storage of metrology data from the metrology module 210, packaging of the metrology data into data transmission packets for transmission by the transceiver 208, or any other operations associated with the metrology module 210. In an example, the transceiver 208 may be replaced by an individual transmitter and an individual receiver. In another example, the transceiver 208 may be replaced by only a transmitter (i.e., a device only capable of transmitting data to other devices) or only a receiver (i.e., a device only capable of receiving data from other devices).

In an example, the microcontroller 206 may include a power-on-reset threshold voltage. The power-on-reset threshold causes the microcontroller 206 to reset when a voltage applied to the microcontroller 206 drops below the power-on-reset threshold voltage. When the SMPS 204, the microcontroller 206, and the transceiver 208 initiate a data transmission cycle, the inrush current from the power provided by the battery 116 may be significant (e.g., in the order of 1 to 2 amperes). Initiating the transmission cycle may involve the application of battery power from the battery 116 to the SMPS 204, the microcontroller 206, the transceiver 208, or any combination thereof. As a result of the high current that occurs when the battery endpoint node 200 initiates the transmission cycle, a voltage sag may occur at the microcontroller 206. In an example, the voltage sag occurring at the microcontroller 206 may result in the voltage applied to the microcontroller 206 falling below the power-on-reset voltage threshold of the microcontroller 206. When the voltage falls below the power-on-reset voltage threshold of the microcontroller 206, a sporadic reset of the microcontroller 206 may occur.

To avoid having the voltage fall below the power-on-reset voltage threshold of the microcontroller 206, the inrush current limiter 202 limits the current drawn from the battery 116 when the battery endpoint 200 initiates the transmission cycle. In an example, the inrush current limiter 202 includes a switching device 212 and a switching device 214. Upon receiving an enable signal 216 from the microcontroller 206, the switching device 212 closes to provide power from the battery 116 to a switching device 218. Based on the same enable signal 216 from the microcontroller 206, the switching device 214 opens to prevent discharging of a capacitor 220. The switching devices 212 and 214 may be solid-state switches such as metal-oxide semiconductor field-effect transistors (MOSFETs). As illustrated, the switching device 212 is a normally open complementary metal-oxide semiconductor (CMOS) switch, and the switching device 214 is a normally closed CMOS switch. Because of the normally open and normally closed arrangement, one of the switching devices 212 or 214 will be open while the other switching device 212 or 214 is closed.

When the enable signal 216 is provided to the switching device 212 to control the switching device 212 into a closed state, power from the battery 116 is applied to the switching device 218 and the capacitor 220. The switching device 218 may be a normally-off switching device, such as a p-channel enhancement type MOSFET. The normally-off switching device 218 transitions to a fully-on state when the voltage difference between a source 222 and a gate 224 of the switching device 218 exceeds a threshold value. When the switching device 218 is in the fully-on state, a resistance across the switching device 218 is minimal and power from the battery 116 is supplied to the SMPS 204.

If the capacitor 220 is fully discharged, the capacitor 220 initially acts as a short-circuit between a source 222 and a gate 224 of the switching device 218 when the power from the battery 116 is applied to the switching device 218 and the capacitor 220. Because the voltage drop across the capacitor 220 is minimal when power is initially applied to the fully discharged capacitor 220, the voltage difference between the source 222 and the gate 224 is close to zero and a resistance across the switching device 218 remains very high (i.e., the switching device 218 remains effectively in a fully-off state). As the capacitor 220 charges over an RC time constant, which is established by a resistance value of a resistor 226 and a capacitance value of the capacitor 220, the resistance across the capacitor 220 increases. Because of this increases in resistance across the capacitor 220, the voltage difference between the source 222 and the gate 224 increases, and the switching device 218 gradually transitions toward the fully-on state. That is, the switching device 218 functions as a time-variable channel resistance over the RC time constant of the resistor 226 and the capacitor 220 until the capacitor 220 is fully charged.

The capacitance of the capacitor 220, the resistance of the resistor 226, or both may be adjusted to control the time taken for the switching device 218 to transition into the fully-on state. For example, if a significant amount of inrush current occurs within the first 0.5 ms of the transmission cycle, the capacitor 220 and the resistor 226 may be selected such that the RC time constant is greater than 0.5 ms. In one example, the capacitor 220 and the resistor 226 are selected based on a communication protocol of the transceiver 208. For example, a transceiver 208 transmitting using an RF mesh protocol may have a slightly different transmission cycle timing than a transceiver 208 transmitting using an RF mesh IP protocol.

The time-variable channel resistance of the switching device 218 may prevent a current inrush at the bulk input capacitor 228 and the SMPS 204. Because of Ohm's law, the heightened initial resistance limits the current across the switching device 218 when the battery endpoint node 200 initiates the transmission cycle. Accordingly, an increase in inrush current that results in the voltage sag is avoided, and the voltage provided to the microcontroller 206 remains above the power-on-reset threshold voltage of the microcontroller 206.

When the transceiver 208 completes a process of receiving or transmitting data packets to other nodes or devices in, for example, the networked system 100, the microcontroller 206 removes the enable signal 216 from the switching devices 212 and 214. By removing the enable signal 216, the switching device 212 transitions into an open state, and the switching device 214 transitions into a closed state. These transitions of the switching devices 212 and 214 remove application of power from the battery 116 to the SMPS 204 and begin a discharging process of the capacitor 220.

Because the switching device 214 is coupled to ground, closing the switching device 214 provides a discharging path for the capacitor 220. In an example, a transmission cycle may include the transceiver 208 operating for 20 ms and switching off for 5 ms. This transmission cycle may repeat continuously. To ensure that the switching device 218 turns off quickly enough to begin a subsequent transmission cycle in an "off" or "open" state, the capacitor 220 should be capable of discharging very quickly. Thus, the path across the switch 214 is connected to ground to provide an efficient discharge path for the capacitor 220. In an example, the capacitance of the capacitor 220 is selected such that the capacitor 220 is able to discharge completely during the switching off time frame of the transmission cycle. For example, during a transmission cycle where the transceiver 208 operates for 20 ms and switches off for 5 ms, the capacitor 220 is selected such that it is capable of fully discharging in fewer than 5 ms to ensure that the switching device 218 is in a fully-off state when a subsequent transmission cycle begins.

Figure 3:
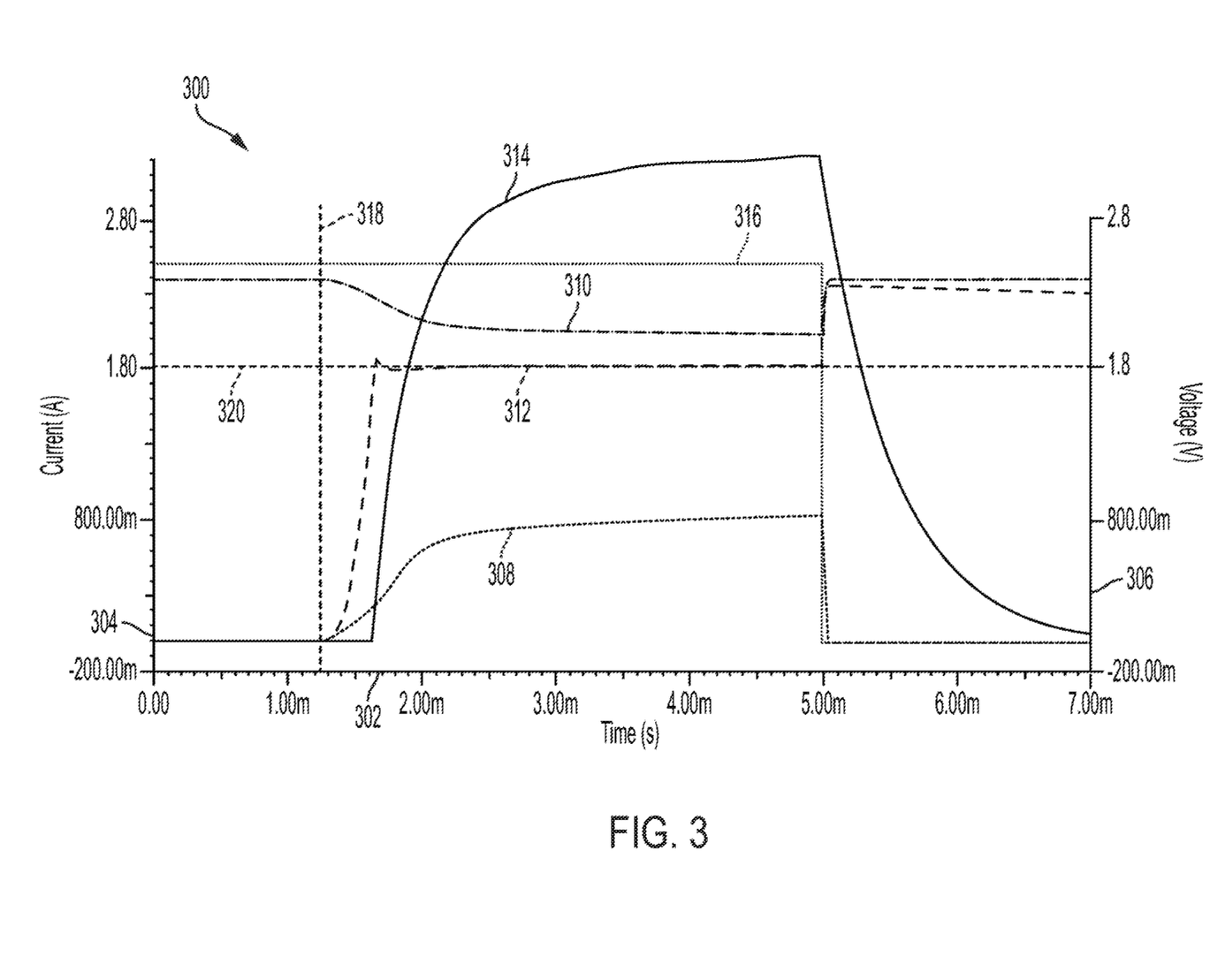
FIG. 3 is a graph depicting controlled inrush current provided by the inrush current limiter of FIG. 2, according to certain embodiments of the present disclosure.

FIG. 3 is a graph 300 depicting controlled inrush current provided by the inrush current limiter 202. The graph 300 includes an abscissa 302 representing time in seconds, a first ordinate 304 representing current in amperes, and a second ordinate 306 representing voltage in volts. With reference to components of FIG. 2, a line 308 provides an indication of a current flowing to the SMPS 204, a line 310 provides an indication of a voltage output from the battery 116, a line 312 represents a voltage at the bulk input capacitor 228, a line 314 represents an output voltage from the SMPS 204 to the microcontroller 206 and the transceiver 208, and a line 316 represents an enable signal 216 provided to control the switching devices 212 and 214.

As illustrated, at time 318, a transmission cycle of the transceiver 208 is initiated, and the current flowing to the SMPS 204 and depicted by the line 308 gradually begins to rise. Because the current gradually rises (i.e., there is no inrush current spike), the voltage output by the battery 116 and depicted by the line 310 does not include an initial voltage sag that would fall below a power-on-reset threshold voltage 320. As illustrated, the power-on-reset threshold voltage 320 may be 1.8 V. Other power-on-reset threshold voltages 320 may also be used depending on the specifications of the microcontroller 206.

Figure 4:
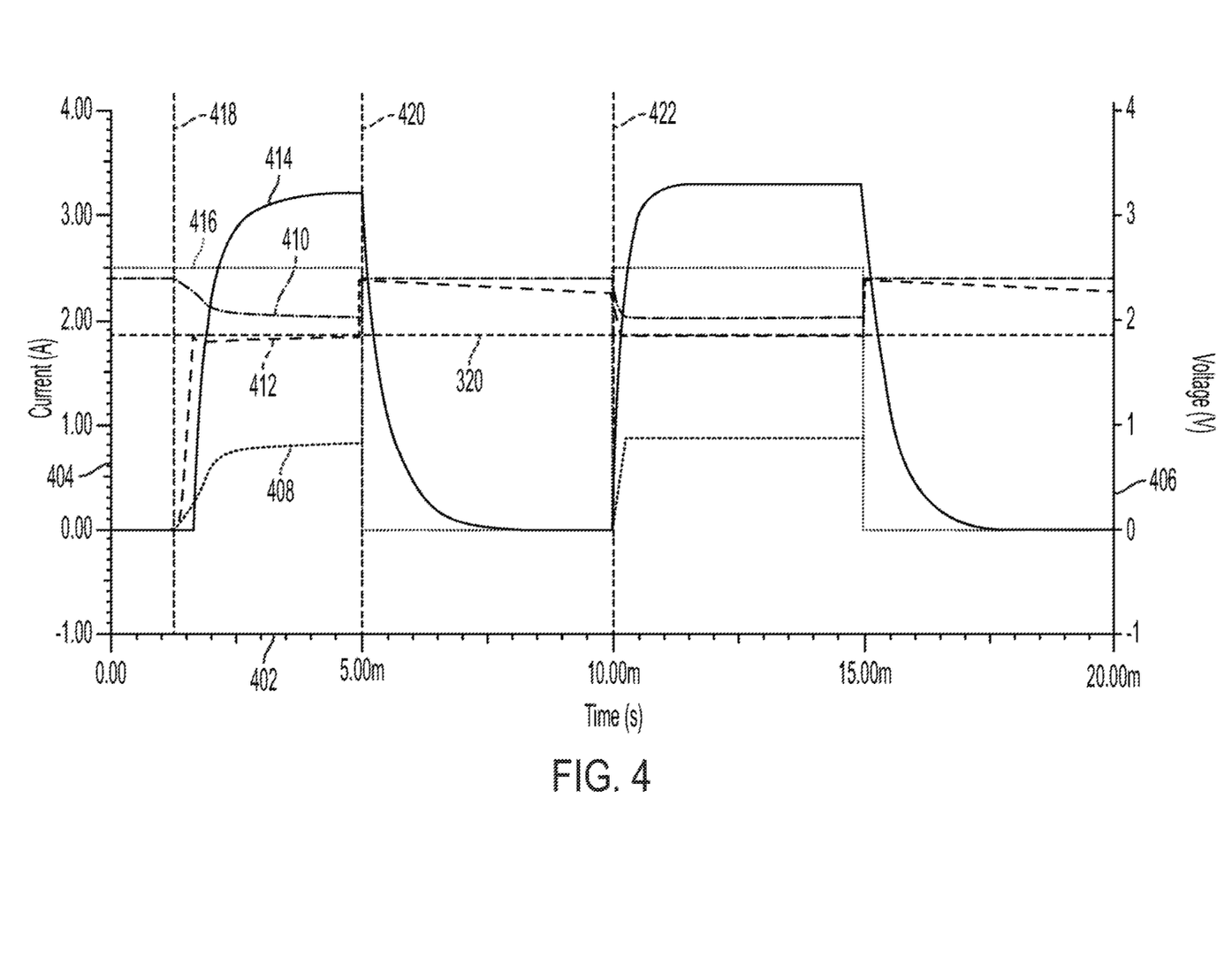
FIG. 4 is a graph depicting controlled inrush current provided by the inrush current limiter of FIG. 2 over multiple transmission cycles, according to certain embodiments of the present disclosure.

FIG. 4 is a graph 400 depicting the controlled inrush current provided by the inrush current limiter 202 over multiple transmission cycles. The graph 400 includes an abscissa 402 representing time in seconds, a first ordinate 404 representing current in amperes, and a second ordinate 406 representing voltage in volts. With reference to components of FIG. 2, a line 408 provides an indication of a current flowing to the SMPS 204, a line 410 provides an indication of a voltage output from the battery 116, a line 412 represents a voltage at the bulk input capacitor 228, a line 414 represents an output voltage from the SMPS 204 to the microcontroller 206 and the transceiver 208, and a line 416 represents an enable signal 216 provided to control the switching devices 212 and 214.

As illustrated, at time 418, a transmission cycle of the transceiver 208 begins, and the current flowing to the SMPS 204 and depicted by the line 408 gradually begins to rise. Because the current gradually rises (i.e., there is no inrush current spike), the voltage output by the battery 116 and depicted by the line 410 does not include an initial voltage sag that would fall below a power-on-reset threshold voltage 320.

At time 420, the enable signal 116 represented by the line 416 falls to 0 upon completion of the data packet transmission by the transmitter 208. Accordingly, the output voltage from the SMPS 204 represented by the line 414 gradually falls to 0 V, and the current flowing to the SMPS 204 represented by the line 408 falls to 0 A. This occurs because the switching device 218 transitions to a fully-off state. At time 422, a new transmission cycle begins.

Figure 5:
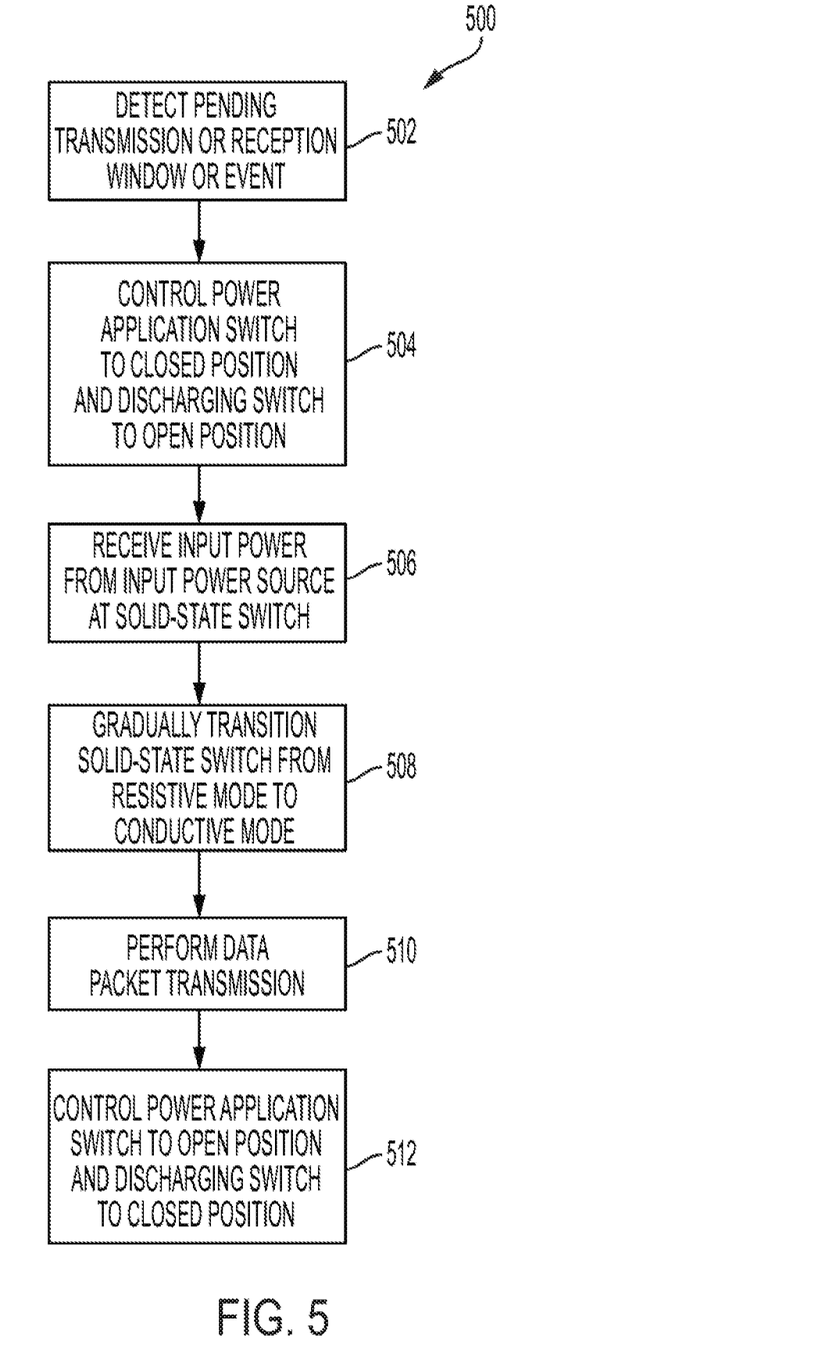
FIG. 5 is a flowchart of a process for limiting inrush current during a transmission cycle of the battery endpoint node of FIG. 2, according to certain embodiments of the present disclosure.

FIG. 5 is a flowchart of a process 500 for limiting inrush current during a transmission cycle of the transceiver 208. At block 502, the process 500 involves detecting a data transmission or reception window or a pending data transmission or reception event by the microcontroller 206. In an example, the microcontroller 206 may control the transceiver 208 on a regular transmission cycle. For example, the transceiver 208 may be controlled by the microcontroller 206 to transmit or receive data packets for 20 ms, to sleep for 5 ms, and to repeat the transmission and sleep cycle. The microcontroller 206 may detect when an upcoming data transmission or reception window will occur.

Further, the microcontroller 206 may also detect pending transmission or reception events (e.g., data packets ready for transmission or reception by the transceiver 208 outside of the standard transmission and sleep cycle of the transceiver 208). Such data packets may include status indicators of the battery endpoint node 200 indicating that the battery endpoint node 200 requires immediate attention or maintenance. Pending reception events may include pre-scheduled wake times for the transceiver 208 to receive data packets from a data source outside of the standard transmission and sleep cycle of the transceiver 208. Other data packets may also be transmitted or received outside of the standard transmission and sleep cycle of the transceiver 208.

At block 504, in response to detecting a transmission or reception window or a pending transmission or reception event, the process 500 involves controlling a power application switch (e.g., the switching device 212) to a closed position and controlling a discharging switch (e.g., the switching device 214) to an open position. The enable signal 216 may provide a control signal that closes or opens each of the switching devices 212 and 214, and the switching device 212 may close at approximately the same time that the switching device 214 opens. As used herein, the phrase "approximately the same time" may indicate that an action occurs within 0.05 ms of each other. Further, closing the power application switch provides power from the battery 116 to the capacitor 220 and the switching device 218.

At block 506, the process 500 involves receiving input power from an input power source (e.g., the battery 116) at a solid-state switch (e.g., the switching device 218). Due to the capacitor 220 initially operating as a short circuit between the source 222 and the gate 224 of the switching device 218, a voltage difference between the source 222 and the gate 224 is zero. With no voltage difference between the source 222 and the gate 224, the switching device 218 remains in a fully resistive mode.

At block 508, the process 500 involves the switching device 218 gradually transitioning from the fully resistive mode to a conductive mode. For example, over the RC time constant established by the resistor 226 and the capacitor 220, the switching device 218 gradually transitions to a fully on state when the input power from the battery 116 is applied to the switching device 218 and the capacitor 220. By gradually transitioning to the fully on state, an inrush current spike resulting from the SMPS 204 and the bulk input capacitor 228 is avoided. In this manner, a voltage sag below a power-on-reset voltage of the microcontroller 206 is also avoided. For example, if the inrush current spike is predicted to be at 5 ms after startup of the SMPS 204, then the RC time constant may be tuned to 6 ms to avoid the inrush current spike. To facilitate tuning of the RC time constant, the resistor 226 may be a variable resistor (such as a potentiometer), the capacitor 220 may be a variable capacitor, or both the resistor 226 and the capacitor 220 may be variable.

At block 510, the process 500 involves performing a data packet transmission by the transceiver 208. In an example, the transceiver 208 transmits data packets of metrology data received from the metrology module 210 to other nodes or devices in the networked system 100. The transceiver 208 may also transmit any other information associated with the battery endpoint node 110, or any other information relevant to other nodes or the head-end system 102.

At block 512, the process 500 involves controlling the power application switch (e.g., the switching device 212) to an open position and controlling the discharging switch (e.g., the switching device 214) to a closed position. By transitioning the switching device 212 to the open position, the power from the battery 216 is removed from the switching device 218 and the capacitor 220. In an example, the switching device 212 is a normally-open transistor and the switching device 214 is a normally closed transistor. In such an example, the microcontroller 206 is able to control the switching devices 212 and 214 to opposite states with an individual control signal by applying or removing the control signal at both of the switching devices 212 and 214. Further, by closing the switching device 214, the capacitor 220 is quickly discharged across the switching device 214 to await a subsequent transmission cycle. In an additional example, the switching device 214 may not be present, and the capacitor 220 may be discharged slowly over a period of time (e.g., across a resistor coupled to ground).

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

That which is claimed is:

1. A resource metering system, comprising:
a resource metrology module;
a transmitter configured to send data packets associated with the resource metrology module to a head-end system or other resource metering systems;
a battery configured to provide power to the transmitter;
an inrush current limiter comprising:
  a solid-state switch in series with the battery and the transmitter;
  a capacitor coupled between a source and a gate of the solid-state switch;
  a first switching device configured to control application of the power from the battery to the solid-state switch;
  a second switching device configured to provide a discharge path of the capacitor upon completion of a task by the transmitter; and
  a resistor coupled between the gate of the solid-state switch and ground, wherein the solid-state switch is configured to gradually transition from an open state to a closed state over a time constant of the capacitor and the resistor upon application of power from the battery to the solid-state switch, and wherein the closed state of the solid-state switch enables transmission of the power from the battery to the transmitter; and
a controller configured to receive the power from the battery and to control the transmitter, wherein the solid-state switch is configured to maintain a voltage of the power received by the controller above a power-on-reset threshold voltage of the controller, and wherein the controller provides a control signal to control the first switching device and the second switching device.

2. The system of claim 1, wherein the solid-state switch comprises an enhancement mode p-type metal-oxide semiconductor.

3. The system of claim 1, wherein the first switching device is controlled by the controller to open to stop application of the power from the battery to the solid-state switch when the second switching device closes to discharge the capacitor.

4. The system of claim 1, wherein the task completed by the transmitter comprises transmitting a data packet.

5. The system of claim 1, wherein the first switching device comprises a normally open complementary metal-oxide-semiconductor (CMOS) transistor and the second switching device comprises a normally closed CMOS transistor.

6. The system of claim 1, wherein the battery comprises a manganese dioxide lithium battery.

7. The system of claim 1, further comprising:
a switched-mode power supply configured to receive the power from the inrush current limiter and to control a voltage of the power provided to the transmitter to a predetermined voltage value.

8. A method, comprising:
receiving an input power from an input power source at (i) a solid-state switch of an inrush current limiting device and (ii) a resistor-capacitor circuit of the inrush current limiting device, wherein the inrush current limiting device is in a resistive mode configured to prevent transmission of an output power from the inrush current limiting device to a transceiver of a resource metering device;
gradually transitioning the solid-state switch from the resistive mode to a conductive mode over a resistor-capacitor time constant of the resistor-capacitor circuit while maintaining a voltage of the input power above a power-on-reset voltage threshold of a microprocessor controlling the transceiver of the resource metering device; and closing a discharging switch to discharge a capacitor of the resistor-capacitor circuit upon completion of a packet transmission by the transceiver.

9. The method of claim 8, further comprising:
opening a battery applicator switch positioned in series between the battery and the solid-state switch upon closing the discharging switch.

10. The method of claim 8, wherein the resistor-capacitor circuit of the inrush current limiting device is tuned by changing a resistance of a resistor of the resistor-capacitor circuit or changing a capacitance of a capacitor of the resistor-capacitor circuit based on a predicted timing of a current spike of a switched-mode power supply positioned in series between the inrush current limiting device and the transceiver.

11. The method of claim 8, wherein the resistor-capacitor time constant is tuned based on a timing of a communication protocol used during the packet transmission by the transceiver.

12. The method of claim 8, further comprising:
transitioning the solid-state switch from the conductive mode to the resistive mode upon closing the discharging switch.

13. The method of claim 8, wherein the capacitor is fully discharged before receiving the input power from the input power source at the solid-state switch during a subsequent data transmission cycle.

14. A system, comprising:
a resource metrology module;
a controller configured to control components of the resource metrology module, wherein the controller comprises a power-on-reset voltage threshold;
a battery configured to provide power to the controller;
a solid-state switch in series with the battery and the controller;
a capacitor coupled between a source and a gate of the solid-state switch;
a resistor coupled between the gate of the solid-state switch and ground, wherein the solid-state switch gradually transitions from an open state to a closed state over a time constant of the capacitor and the resistor upon application of power from the battery to the solid-state switch, and wherein a voltage of the power from the battery to the solid-state switch is maintained above the power-on-reset voltage threshold while the solid-state switch transitions from the open state to the closed state;
a first switching device configured to control the application of power from the battery to the solid-state switch; and
a second switching device configured to provide a discharge path of the capacitor upon completion of a task by the controller.

15. The system of claim 14, wherein the task by the controller comprises controlling a transmitter to transmit a data packet.

16. The system of claim 14, wherein the first switching device is controlled to open by the controller when the second switching device closes to discharge the capacitor.

* * * * *